US012631580B2

(12) United States Patent
Zheng et al.

(10) Patent No.: US 12,631,580 B2
(45) Date of Patent: May 19, 2026

(54) METHOD FOR ANALYZING QUALITY OF THIN SURFACE LAYER OF PCB

(71) Applicant: GUANGZHOU TERMBRAY ELECTRONICS TECH CO., LTD., Guangzhou (CN)

(72) Inventors: Jian Zheng, Guangzhou (CN); Guojin Luo, Guangzhou (CN)

(73) Assignee: GUANGZHOU TERMBRAY ELECTRONICS TECH CO., LTD., Guangzhou (CN)

( * ) Notice: Subject to any disclaimer, the term of this patent is extended or adjusted under 35 U.S.C. 154(b) by 447 days.

(21) Appl. No.: 18/300,165

(22) Filed: Apr. 13, 2023

(65) Prior Publication Data

US 2023/0251216 A1 Aug. 10, 2023

Related U.S. Application Data

(63) Continuation of application No. PCT/CN2021/136513, filed on Dec. 8, 2021.

(30) Foreign Application Priority Data

Dec. 9, 2020 (CN) .......................... 202011430349.0

(51) Int. Cl.
*G01N 1/28* (2006.01)
*G01N 23/2251* (2018.01)
(52) U.S. Cl.
CPC ........... *G01N 23/2251* (2013.01); *G01N 1/28* (2013.01); *G01N 2223/418* (2013.01)

(58) Field of Classification Search
CPC ............... G01N 23/22; G01N 23/2202; G01N 23/2208; G01N 23/2251; G01N 23/2255;
(Continued)

(56) References Cited

U.S. PATENT DOCUMENTS

2006/0070769 A1* 4/2006 Kim ....................... H05K 3/421
174/262
2011/0140729 A1* 6/2011 Nakamura .............. H01J 37/28
324/762.01

FOREIGN PATENT DOCUMENTS

CN 1979791 A 6/2007
CN 101173881 A 5/2008
(Continued)

*Primary Examiner* — David E Smith
*Assistant Examiner* — Hsien C Tsai
(74) *Attorney, Agent, or Firm* — MUNCY, GEISSLER, OLDS & LOWE, P.C.

(57) ABSTRACT

A method for analyzing the quality of a thin layer surface of PCB includes steps of taking a region to be tested from the PCB as a sample by scissors or an automatic sampler; performing gold spraying treatment; fixing a sample to be tested onto a metal sample platform, and then mounting the sample platform on the inclined surface of a test platform; depositing a first protective layer by an electron beam; after deposition with the electron beam is completed, depositing a second protective layer by a focused ion beam; adjusting the angle of inclination of the test platform to ensure that the surface of the sample can be cut perpendicular to the direction of the focused ion beam; and finally adjusting angle of inclination of the sample to perform observation. The method can avoid influences of chemical solutions, mechanical stress, and impurity contamination in the sample preparation process.

11 Claims, 2 Drawing Sheets scanning electron microscope focused ion beam

45°

90°

(58) Field of Classification Search
     CPC ......... G01N 2223/61; G01N 2223/072; G01N
                       2223/081; G01N 2223/418; G01N
                             2223/6113; G01N 1/28
     See application file for complete search history.

(56)                    References Cited

FOREIGN PATENT DOCUMENTS

| CN | 101246132 A |   | 8/2008 | |
|----|-------------|---|--------|---|
| CN | 103196728 A | * | 7/2013 | |
| CN | 106289909 A |   | 1/2017 | |
| CN | 106449340 A | * | 2/2017 | ............. H01J 37/20 |
| CN | 107607570 A |   | 1/2018 | |
| CN | 107976457 A |   | 5/2018 | |
| CN | 210167321 U |   | 3/2020 | |
| CN | 112577982 A |   | 3/2021 | |
| JP | 2001272316 A |  | 10/2001 | |

* cited by examiner

METHOD FOR ANALYZING QUALITY OF THIN SURFACE LAYER OF PCB

CROSS REFERENCE TO RELATED APPLICATIONS

The present application is a continuation of International Application No. PCT/CN2021/136513, filed on Dec. 8, 2021, which claims priorities from Chinese Invention Application No. 202011430349.0 filed on Dec. 9, 2020, all of which are hereby incorporated herein by reference.

TECHNICAL FIELD

The present invention relates to the technical field for analysis of a thin surface layer of a PCB, in particular to a method for analyzing the quality of the thin surface layer of PCB.

BACKGROUND

With the increasing levels of science and technology and continuous upgrading of electronic products, printed circuit boards (PCBs) tend to developing towards high-grading, precision and advance. The surface layer of the PCB thus tends to be thinner and thinner, which is a plating layer by plating process, such as electroless Nickel-Gold plating, electroless Nickel-Palladium-Gold plating, electroless Silver plating, electroless Tin plating, plating of a connecting finger, and organic solderability preservative (OPS). Accordingly, new requirements are raised for analyzing the quality of such thin plating layers. Meanwhile, it is also urgent to solve the problems about contaminants on the surface layer and the thickness and component analysis thereof after contamination.

For existing methods for analyzing the quality of thin surface layers, according to the current analysis method, a greater than 3 μm Nickel layer is generally electroplated or chemically deposited to protect the surface layer of PCB, then vertical slicing is performed, the obtained slices are subjected to processes of grinding, polishing and the like to obtain qualified vertical slices, and finally are tested with a scanning electron microscope, information about the thickness and component of the thin surface layer is thus acquired.

However, the existing method has defects that (1) it may lead to secondary chemical contamination, as electroplating Nickel or electroless deposited Nickel is required, while the solution for electroplating or depositing may erode the surface of the plating layer, resulting in inaccurate test result; (2) in the mold injection process of the vertical slices, resin is required and a curing process is needed, which may cause a thermal stress, consequently damaging the soft surface plating layer with gold, tin, etc.; (3) in the making process of vertical slices, grinding, and polishing, etc. are needed, it thus may inevitably suffer influence of mechanical stress, such as polishing, and may also inevitable suffer contamination from polishing paste, or ions in water, which thus may lead to inaccuracy of subsequent component analysis of the plating layer; (4) it is time-consuming, usually taking four to five hours to make the slices before performing vertical observation with a scanning electron microscopy, and it generally takes one day to complete this method. Therefore, the traditional analysis method is time-consuming, complex in process and prone to cause test inaccuracy.

SUMMARY

Therefore, the present invention provides a method for analyzing the quality of a thin surface layer of a PCB, with a double-beams of an electron beam and an focused ion beam for sample processing and testing, which can avoid influences of chemical solutions, mechanical stress, and impurity contamination in the sample preparation process. By optimizing the test of the scanning electron microscope, a near-vertical observation effect can be achieved to obtain an accurate test result, thereby quickly completing a series of tests, and thus free from the problem of time-consuming, complex in process, and prone to cause test inaccuracy in the traditional analysis method.

According to the present invention, the method for analyzing the quality of the thin surface layer of PCB, including the following steps.

In step of S1, a sample is taken from the PCB. In this step, a region to be tested is taken from the PCB as the sample by scissors, an automatic sampler or nail scissors or other tools, and the region to be tested is required to be close to the edge of the PCB as much as possible.

In step of S2, gold spraying treatment is performed. In this step, conductive treatment is performed on the surface of the sample by spraying gold.

In step of S3, the sample is fixed and transferred. In this step, the sample to be tested is firmly fixed on a metal sample platform, ensuring good conductivity between the surface of the sample and the metal sample platform, then the sample platform with the sample is mounted on an inclined surface of a test platform, and the region required to be tested is required to face the highest position of the test platform.

In step of S4, a protective layer is deposited by an electron beam. A first protective layer deposited by the electron beam can avoid damage to the metal surface during deposition in the next step.

In step of S5, a second protective layer is deposited by a focused ion beam. After deposition by the electron beam is completed, fast imaging is performed by the focused ion beam to determine the position of the first protective layer, with the cumulative imaging time no longer than 1 second, and then a second protective layer is deposited by the focused ion beam.

In step of S6, an observation surface is formed. After the second protective layer is deposited, the angle of inclination of the test platform is adjusted to ensure that the surface of the sample can be cut to form an observation surface, with the surface of the sample perpendicular to the direction of the focused ion beam.

In step of S7, observation is performed with a scanning electron microscope. The angle of inclination of the sample is adjusted to ensure an adequate test space and safety of relevant test devices, and after the position of the sample is adjusted, observation to the observation surface is performed.

According to the present invention, the distance between the region to be tested and the edge of the PCB in step S1 is preferably less than 2 mm.

According to the present invention, the thickness of gold spraying in step S2 is preferably within 5 nm.

According to the present invention, the angle of the inclined surface of the test platform in step S3 is preferably 45 degrees.

According to the present invention, the first protective layer in step S4 is tungsten or platinum with a thickness of 50 nm, or carbon with a thickness of 100 nm.

According to the present invention, in step of S5, the current of the focused ion beam is not higher than 3 nA, and before deposition with the focused ion beam, the cumulative time for imaging with the focused ion beam is required to be no longer than 1 second to prevent the focused ion beam from damaging the first protective layer. The deposition thickness of the focused ion beam is preferably 300-600 nm.

According to the present invention, the angle between the surface of the sample and the direction of the electron beam of the scanning electron microscope in step S7 is 7 degrees.

Compared with the prior art, the present invention has some beneficial effects. The method according to the present invention makes rational use of the inclined surface of a test platform, and optimizes the sample testing process in combination with the angles between two beams of the electron beam and the focused ion beam and the electron microscope to achieve optimal testing. In the process of manufacturing a sample, protective layers are deposited by respectively the electron beam and the focused ion beam to completely protect the surface of the sample to be tested, then an observation surface is formed by cutting with the focused ion beam, and the angle of inclination is finally adjusted again to have an optimal angle of observation to the observation surface.

DETAILED DESCRIPTION OF EMBODIMENTS

Figure 1:
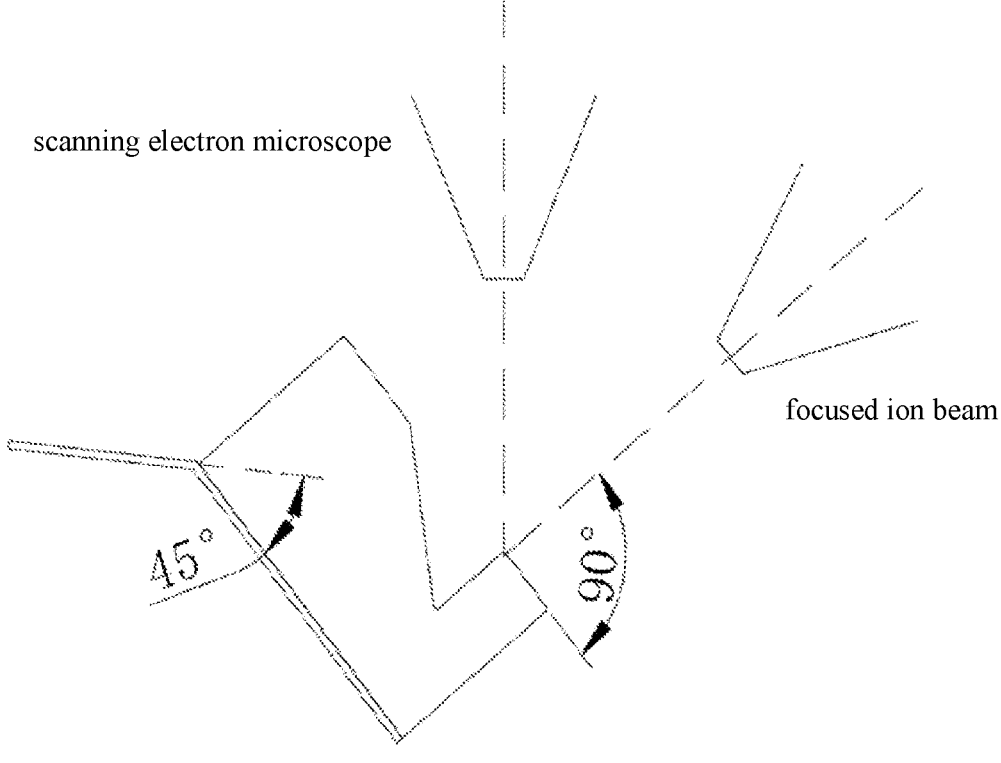
FIG. 1 is a schematic diagram of adjusting the angle of cutting according to the present invention.
Figure 2:
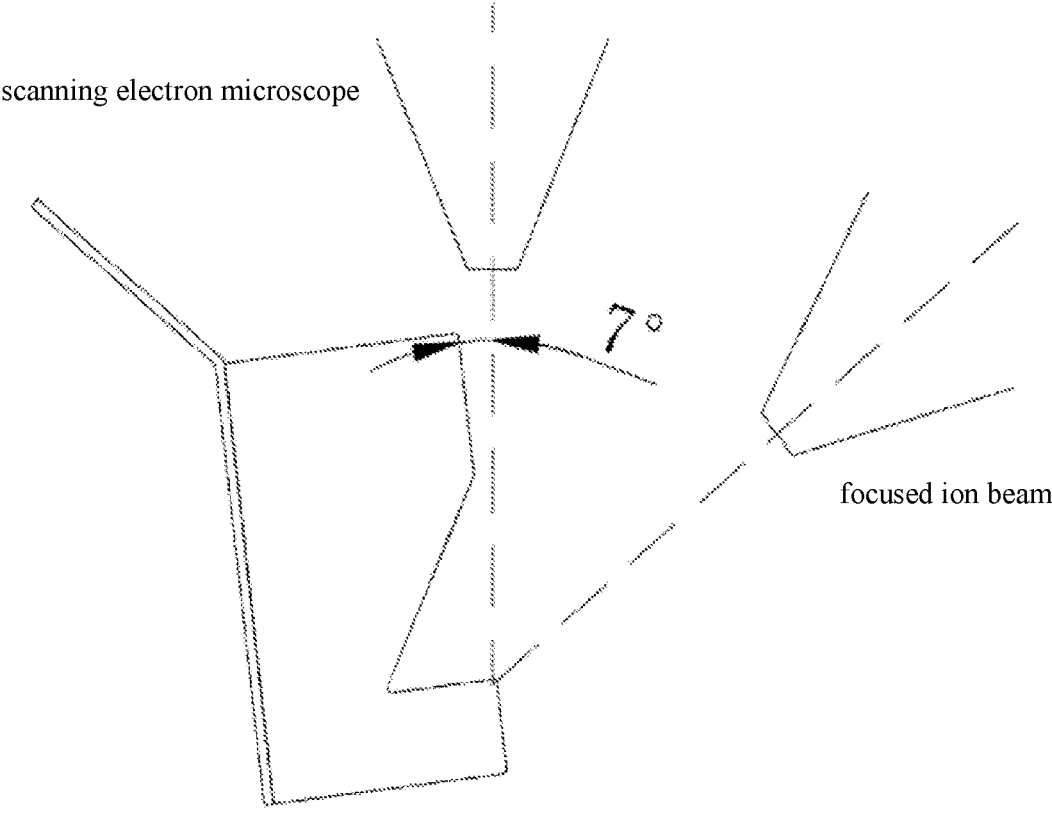
FIG. 2 shows adjusting angle of observation of a thin surface layer according to the present invention.

The technical solutions in embodiments of the present invention will be clearly and completely described below with reference to the embodiments of the present invention. Apparently, the described embodiments are merely some rather than all of the embodiments of the present invention. Based on the embodiments of the present invention, all other embodiments obtained by a person of ordinary skill in the art without involving any inventive effort fall within the scope of protection of the present invention.

In the description of the present invention, it should be noted that, the orientation or positional relationships indicated by the terms "upper," "lower," "inner," "outer," "front end", "rear end", "two ends", "one end", "the other end", etc. are only for facilitating the description of the present invention and simplifying the description, rather than indicating or implying that the apparatus or element referred to must have a particular orientation or be constructed and operated in a particular orientation, and therefore will not be interpreted as limiting the present invention. In addition, terms "first" and "second" are merely used for description and should not be understood as indicating or implying the relative importance.

In the description of the present invention, it should be noted that, unless otherwise explicitly specified and defined, terms such as "mount", "provided with", "connect", etc. should be understood in a broad sense. For example, the "connection" may be a fixed connection, or a detachable connection, or an integral connection; the connection may be a mechanical connection, and may also be an electrical connection; the connection may be a direct connection, an indirect connection through an intermediate, or internal communication between two elements. A person of ordinary skill in the art may understand the specific meanings of the foregoing terms in the present invention according to specific situations.

The present invention provides a method for analyzing quality of a thin surface layer of a PCB.

Embodiment 1

According to one embodiment of the present invention, a method for analyzing quality of a surface thin layer of a PCB includes the following steps.

In step S1, a sample is taken from the PCB. In this step, a region to be tested is taken from the PCB as the sample by scissors, an automatic sampler or nail scissors or any other tools, a surface of the region is then blown clean with a high-pressure air gun. The region to be measured is required to close to the edge of the PCB sample as much as possible, and the distance between the region and the edge of the PCB is less than 2 mm according to the present embodiment.

In step of S2, gold spraying treatment is performed. Conductive treatment is performed on the surface of the sample by spraying gold, and the thickness of gold spraying is within 5 nm according to the present embodiment.

In step of S3, the sample is fixed and transferred. In this step, the sample to be tested is firmly fixed on a metal sample platform, with good conductivity between the surface of the sample and the metal sample platform, and then the sample platform with the sample is mounted on an inclined surface of a test platform, with the region to be tested facing the highest position of the test platform. The inclined angle of the inclined surface of the test platform is 45 degrees according to the present embodiment.

In step of S4, a first protective layer is deposited by an electron beam. In this step, a tungsten layer of about 50 nm is deposited by the electron beam as a first protective layer, which can avoid damage to the surface to be tested in the next step of deposition with a focused ion beam.

In step of S5, a second protective layer is deposited by a focused ion beam. In this step, after deposition with the electron beam is completed, the current of the focused ion beam is selected to be 3 nA, fast imaging is performed by the focused ion beam to determine the position of the first protective layer, with the cumulative imaging time no long than 1 second, then a second protective layer is deposited by the focused ion beam, with 300 nm deposition thickness of the second protective layer. In this process, nickel plating is not required so that possible damage or contamination to the sample can be avoided, and a stress generated in the mold injection process is also avoided.

In step of S6, an observation surface is formed. After the second protective layer is deposited, the inclination angle of the test platform is adjusted to ensure that the sample is cut to form an observation surface with the surface thereof perpendicular to the direction of the focused ion beam. Such way can avoid stress damage and unknown contamination generated during traditionally grinding and polishing of the sample.

In step of S7, observation with a scanning electron microscope is performed. The inclination angle of the sample relative to the direction of the electron beam of the scanning electron microscope is adjusted to ensure an adequate observation space and safety of relevant test devices, after the position of the sample is adjusted, observation to the observation surface is performed. The angle between the surface of the sample and the direction of the electron beam of the scanning electron microscope is 7 degrees according to the present embodiment.

Embodiment 2

According to another embodiment of the present invention, a method for analyzing quality of a surface thin layer of a PCB includes the following steps.

In step of S1, a sample is taken form the PCB. In this step, a region to be tested is taken from the PCB as the sample by scissors, an automatic sampler or nail scissors or any other tools, a surface of the region is then blown clean with a high-pressure air gun. The region to be measured is close to the edge of the PCB as much as possible, and the distance between the region and the edge of the PCB is less than 2 mm according to the present embodiment.

In step of S2, gold spraying treatment is performed. In this step, conductive treatment is performed on the surface of the sample, and the thickness of gold spraying is within 5 nm according to the present embodiment.

In step of S3, the sample is fixed and transferred. In this step, the sample to be tested is firmly fixed on a metal sample platform, with good conductivity between the surface of the sample and the metal sample platform, and then the sample platform with the sample is mounted on an inclined surface of a test platform, with the region to be tested facing the highest position of the test platform. The inclined angle of the inclined surface of the test platform is 45 degrees according to the present embodiment.

In step of S4, a first protective layer is deposited by an electron beam. In this step, a platinum layer of about 50 nm is deposited by the electron beam as a first protective layer to avoid damage to the surface to be tested in the next step of deposition with a focused ion beam. The first protective layer can be tungsten or platinum layer.

In step of S5, a second protective layer is deposited by a focused ion beam. In this step after deposition with the electron beam is completed, the current of the focused ion beam is selected to be 3 nA, fast imaging is performed by the focused ion beam to determine the position of the first protective layer, with the cumulative imaging time no long than 1 second, then a second protective layer is deposited by the focused ion beam, with 500 nm deposition thickness of the second protective layer. In this process, nickel plating is not required so that possible damage or contamination to the sample can be avoided, and a stress generated in the mold injection process is also avoided.

In step of S6, an observation surface is formed. After the second protective layer is deposited, the inclination angle of the test platform is adjusted to ensure that the sample is cut to form an observation surface with the surface thereof perpendicular to the direction of the focused ion beam. Such way can avoid stress damage and unknown contamination generated during traditionally grinding and polishing of the sample.

In step of S7, observation with a scanning electron microscope is performed. The inclination angle of the sample relative to the direction of the electron beam of the scanning electron microscope is adjusted to ensure an adequate observation space and safety of relevant test devices, after the position of the sample is adjusted, observation to the observation surface is performed. The angle between the surface of the sample and the direction of the electron beam of the scanning electron microscope is 7 degrees according to the present embodiment.

Embodiment 3

According to a third embodiment of the present invention, a method for analyzing quality of a surface thin layer of a PCB includes the following steps.

In step S1, a sample is taken from the PCB. In this step, a region to be tested is taken from the PCB as the sample by scissors, an automatic sampler or nail scissors or any other tools, a surface of the region is then blown clean with a high-pressure air gun. The region to be measured is close to the edge of the PCB as much as possible, and the distance between the region and the edge of the PCB is less than 2 mm according to the present embodiment.

In step S2, gold spraying treatment is performed. In this step, conductive treatment is performed on the surface of the sample by spraying gold, and the thickness of gold spraying is within 5 nm according to the present embodiment.

In step S3, the sample is fixed and transferred. In this step, the sample to be tested is firmly fixed on a metal sample platform, with good conductivity between the surface of the sample and the metal sample platform, and then the sample platform with the sample is mounted on an inclined surface of a test platform, with the region to be tested facing the highest position of the test platform. The inclined angle of the inclined surface of the test platform is 45 degrees according to the present embodiment.

In step S4, a first protective layer is deposited by an electron beam. In this step, a carbon layer of about 100 nm is deposited by the electron beam as a first protective layer to avoid damage to the surface to be tested in the next step of deposition with a focused ion beam.

In step S5, a second protective layer is deposited by a focused ion beam. In this step, after deposition with the electron beam is completed, the current of the focused ion beam is selected to be 3 nA, fast imaging is performed by the focused ion beam to determine the position of the first protective layer, with the cumulative imaging time no long than 1 second, then a second protective layer is deposited by the focused ion beam, with 400 nm deposition thickness of the second protective layer. In this process, nickel plating is not required so that possible damage or contamination to the sample can be avoided, and a stress generated in the mold injection process is also avoided.

In step S6, an observation surface is formed. After the second protective layer is deposited, the inclination angle of the test platform is adjusted to ensure that the sample is cut to form an observation surface with the surface thereof perpendicular to the direction of the focused ion beam. Such way can avoid stress damage and unknown contamination generated during traditionally grinding and polishing of the sample.

In step S7, observation with a scanning electron microscope is performed. The inclination angle of the sample relative to the direction of the electron beam of the scanning electron microscope is adjusted to ensure an adequate observation space and safety of relevant test devices, after the position of the sample is adjusted, observation to the observation surface is performed. The angle between the surface of the sample and the direction of the electron beam of the scanning electron microscope is 7 degrees according to the present embodiment.

It is obvious to a person skilled in the art that the present invention is not limited to the details of the exemplary embodiments described above, and that the present invention may be embodied in other specific forms without departing from the spirit or essential features of the present invention. Therefore, the embodiments shall be considered, in all respects, as illustrative and not restrictive, the scope of the present invention is defined by the appended claims rather than by the foregoing description, and therefore, all changes which come within the meaning and range of equivalent elements of the claims are intended to be included in the present invention.

The invention claimed is:

1. A method for analyzing quality of a thin surface layer of a PCB, comprising steps in sequence:

S1) taking a sample:

wherein a region to be tested is taken from the PCB as the sample by a tool, wherein the region to be tested is close to an edge of the PCB;

S2) performing gold spraying treatment:

wherein conductive treatment is performed on a surface of the sample by spraying gold;

S3) fixing and transferring the sample:

wherein the sample to be tested is firmly fixed on a metal sample platform, with conductivity between the surface of the sample and the metal sample platform, then the sample platform with the sample is mounted on an inclined surface of a test platform, with the region to be tested facing the highest position of the test platform;

S4) depositing a first protective layer by an electron beam:

wherein a first protective layer is deposited by the electron beam;

S5) depositing a second protective layer by a focused ion beam:

wherein after depositing by the electron beam is completed, imaging is performed by the focused ion beam to determine position of the first protective layer, and then a second protective layer is deposited on the first protective layer by the focused ion beam;

S6) forming an observation surface, wherein after the second protective layer is deposited, an angle of inclination of the test platform is adjusted to make a surface of the sample perpendicular to the ion beam direction of the focused ion beam, and the surface of the sample is perpendicularly cut by the focused ion beam to form a V-shaped opening inner the surface of the sample, a surface of the opening substantially perpendicular to the surface of the sample is taken as the observation surface; and S7) performing observation with a scanning electron microscope:

wherein the angle of inclination of the sample is adjusted to substantially form a 7-degree angle between the surface of the sample and the direction of the electron beam of the scanning electron microscope, then observation to the observation surface is performed by the scanning electron microscope.

2. The method according to claim 1, wherein a distance between the region to be tested and the edge of the PCB in step S1 is less than 2 mm.

3. The method according to claim 1, wherein a thickness of gold spraying in step S2 is within 5 nm.

4. The method according to claim 1, wherein an angle of the inclined surface of the test platform in step S3 is 45 degrees.

5. The method according to claim 1, wherein the first protective layer in step S4 is tungsten or platinum with a thickness of 50 nm, or carbon with a thickness of 100 nm.

6. The method according to claim 1, wherein in step S5, current of the focused ion beam is no higher than 3 nA, before deposition, time for imaging with the focused ion beam is no longer than 1 second, and deposition thickness of the second protective layer is 300-600 nm.

7. The method according to claim 1, wherein the thin surface layer of the sample to be tested includes an element of gold, platinum, iridium or mercury, the first protective layer in step S4 is a tungsten protective layer of about 50 nm or a carbon protective layer of about 100 nm or above.

8. The method according to claim 1, wherein the thin surface layer of the sample to be tested includes tantalum, hafnium or rhenium, the first protective layer in step S4 is a platinum protective layer of about 50 nm or a carbon protective layer of about 100 nm.

9. The method according to claim 1, wherein the thin surface layer of the sample to be tested includes organic substance with a compound in higher carbon content and an atomic number of 10 or less, the first protective layer in step S4 is a platinum or tungsten protective layer of about 50 nm.

10. The method according to claim 1, wherein the thin surface layer of the sample to be tested includes osmium, the first protective layer in step S4 is a carbon protective layer of about 100 nm.

11. The method according to claim 1, wherein the thin surface layer of the sample to be tested includes other elements, the first protective layer in step S4 is a platinum or tungsten protective layer of about 50 nm, or a carbon protective layer of about 100 nm.

* * * * *